United States Patent [19]

Ungar et al.

[11] Patent Number: 4,741,946

[45] Date of Patent: May 3, 1988

[54] SCUFF AND ABRASION-RESISTANT LAMINATES

[75] Inventors: Israel S. Ungar, Randallstown; Robin D. O'Dell, Pasadena; Sheridan Neimark, Silver Spring, all of Md.

[73] Assignee: Nevamar Corporation, Odenton, Md.

[21] Appl. No.: 916,412

[22] Filed: Oct. 7, 1986

[51] Int. Cl.⁴ .................................................. B32B 5/16

[52] U.S. Cl. .................................... 428/207; 428/203; 428/211; 428/322.2; 428/327; 428/486; 428/537.5

[58] Field of Search ..................... 428/211, 327, 322.2, 428/486, 537.5, 203, 207

[56] References Cited

U.S. PATENT DOCUMENTS

| | | | |
|---|---|---|---|
| Re. 30,233 | 3/1980 | Lane et al. | 428/207 |
| Re. 32,152 | 5/1986 | Scher et al. | 428/207 |
| 4,255,480 | 3/1981 | Scher et al. | 428/208 |
| 4,263,081 | 4/1981 | Scher et al. | 428/208 |
| 4,499,137 | 2/1985 | O'Dell | 428/211 |
| 4,567,087 | 1/1986 | O'Dell | 428/211 |

OTHER PUBLICATIONS

Reprint from American Inkmaker (6 pages).

Polyethylene in Printing Inks (3 pages Including 2 pages of Technical Data of Allied Chemical, Data Sheets I-3 and G-2).

Technical Data Sheet of Allied Chemical, I-1 (2 pages).

Technical Data Sheet of Allied Chemical, G-1 (2 sheets).

Techanical Data Sheet of Allied Chemical, G-8 (3 sheets).

Materials Relating to Shamrock Chemicals Corp. (7 pages).

"Micronized Products for the Ink, Paint and Coatings Industries" of Micro Powders (2 pages).

Micro Powers, Inc. Data Sheets (5 sheets).

*Primary Examiner*—Edith Buffalow

*Attorney, Agent, or Firm*—Browdy and Neimark

[57] ABSTRACT

The scuff-resistance and rub-resistance of decorative laminate made using the special paper of Lane et al U.S. Pat. No. 3,798,111 is substantially improved by incorporating in or very near the surface of the decor paper finely divided polyethylene wax having a particle size of 1-30 microns.

12 Claims, No Drawings

SCUFF AND ABRASION-RESISTANT LAMINATES

FIELD OF INVENTION

The present invention relates to laminates and, more particularly, decorative laminates having good abrasion, scuff and surface wear resistance.

BACKGROUND OF THE INVENTION

High pressure decorative laminates are conventionally produced by stacking and curing under heat and pressure a plurality of layers of paper impregnated with various synthetic thermosetting resins. In normal practice the assembly, from the bottom up, consists of a plurality, e.g. three to eight, core sheets made from phenolic resin impregnated kraft paper, above which lies a decor sheet impregnated with melamine resin; on top of the decor sheet there has been provided an overlay sheet which, in the laminate, is almost transparent and provides protection for the pattern sheet.

The core sheets are conventionally made from kraft paper of about 90–155 pound ream weight. Prior to stacking, the kraft paper is impregnated with a water-alcohol solution of phenolformaldehyde resole, dried and partially cured in a hot air oven, and finally cut into sheets.

The decor sheet is a high quality, 50–125 ream weight, pigment filled, alpha cellulose paper that has been impregnated with a water-alcohol solution of melamine-formaldehyde resin, dried and partially cured, and finally cut into sheets. The decor sheet, prior to impregnation with the resin, is sometimes printed with a decorative design, or with a photo-gravure reproduction of natural materials, such as wood, marble, leather, etc., but it may also be solid colored.

The overlay sheet has been almost invariably used when the decor sheet has a surface printing in order to protect the printing from abrasive wear. The overlay sheet is a high quality alpha cellulose paper of about 15–35 pounds ream weight that is also impregnated with melamine-formaldehyde resin in a manner similar to that used for the decor sheet, except that a greater amount of resin per unit weight of paper is used. The individual sheets are stacked in the manner indicated above and, if six sheets of impregnated core paper are used, there results a finished laminate having a thickness of about 50 mils, it being understood that a different number of sheets can be used to provide thicker or thinner laminates.

The stack of sheets as described above is placed between polished steel plates and subjected to about 230°–340° F. (e.g. 300° F.) at 800–1600 p.s.i. (e.g. 1000 p.s.i.) for a time sufficient to consolidate the laminate and cure the resins (e.g. about twenty-five minutes). This causes the resin in the paper sheets to flow, cure and consolidate the sheets into a unitary laminated mass referred to in the art as a decorative high-pressure laminate. In actual practice, two laminated stacks are pressed back to back, separated by a coated release sheet that allows the two laminates to be peeled apart after separation. Also, a large proportion of the stacks are laminated with an aluminum foil-kraft paper composite sheet inserted between the overlay and the metal plate, with the aluminum facing the overlay, in order to obtain a laminate having a lower gloss and a slighty textured surface which is desirable for some products.

At the completion of the laminating operation, the backs of the laminates are sanded to permit gluing to particle board, plywood or other substrates. The glued, laminate surfaced panel is then fabricated into furniture, kitchen counter tops, table tops, store fixtures and other end-use applications widely accepted for the combination of appearance, durability and economy.

A number of variations of the above-described general process are known, particularly those operations designed to obtain special effects in appearance and texture. Also other curing cycles are possible and, in fact, sometimes other resin systems are used as well.

Besides decorative high-pressure laminates referred to above, there are also a number of low-pressure products which have been developed in more recent years, including low-pressure laminates using either saturated polyester resins or melamine-formaldehyde resin. One of the fastest growing materials competing with high-pressure laminates in more recent years is a product referred to as low-pressure melamine board which is normally pressed in a short cycle at 175–225 p.s.i. and 325°–350° F. These low-pressure products have the advantage of being normally less expensive, but they cannot be given the title of "high pressure laminates" because such a product must meet a variety of rigid standards promulgated by the National Electric Manufacturers Associates, NEMA LD3-1980, which include standards relating to abrasive wear, stain resistance, heat resistance, impact resistance, dimensional stability, etc. While various other decorative printed surfacing materials, such as some of the low-pressure laminates, have certain of the desirable characteristics, no products other than high-pressure laminates currently available have all of these properties.

One of these properties in particular which is very important is abrasion resistance. A high-pressure decorative laminate must have sufficient abrasion resistance to permit use in high exposure areas such as dinette surface tops, check-out counters, etc., The standard NEMA test for abrasion resistance is NEMA test LD-3.01. In this test, a laminate sample is clamped on a rotating disc, over which ride two weighted rubber wheels, faced with calibrated sand-paper strips. As the laminate surface is rotated under the wheels, the abrasive action of the sand paper cuts through the surface of the laminate and gradually through the overlay until the printed pattern is exposed and destroyed. The NEMA standard for Class 1 laminate requires that the laminate, after four hundred rotation cycles, has no more than 50% of its pattern destroyed. The 50% end point is estimated by averaging the number of cycles at which the pattern shows initial wear, and the number of cycles at which the pattern is completely destroyed.

If a high-pressure decorative laminate is prepared in a conventional manner, with a normal 35–40% resin content in the decor sheets, but without an overlay sheet, the abrasion resistance will be only about 50–75 cycles. If specially formulated melamine resins are used in the decor sheet with a resin content of 50–55%, abrasion resistance of up to about 150–200 cycles are on occasion obtainable without an overlay sheet, but in this latter case the laminates have a tendency to develop surface craze and, furthermore, they are quite difficult to prepare due to the difficulty of impregnating the decor sheet in a uniform manner; additionally, they do not meet the 400 cycle minimum required by the NEMA standard.

The U.S. patent to Lane et al U.S. Pat. No. 3,798,111 (reissued as U.S. Pat. No. Re. 30,233) proposes an improved abrasion-resistant laminate without overlay sheet, wherein the print paper is a specially formed paper incorporating abrasion-resistant particles in its upper surface, i.e. the special paper is essentially a two-ply paper. According to this patent, the paper is printed, saturated with melamine resin and used to make high pressure laminate, the theory being that the ink would soak into the abrasive paper layer and the abrasive particles would slow wear. When abrasion resistance was measured using NEMA LD-3-1980, extremely good wear values were obtained, but initial wear values were very low, e.g. as low as 50 cycles. Therefore, the product was never accepted by the industry, as customers complain when wear starts rather than when the pattern has worn out.

Very significant improvements to the conventional system described above have been achieved by the system disclosed in Scher et al U.S. Pat. Nos. 4,255,480 and 4,263,081. These patents and their progeny disclose the production of highly abrasive resistant laminates without overlay, the decor sheet being coated with an ultra-thin layer of small abrasion-resistant particles, e.g. alumina, immobilized in place on the decor sheet by a suitable binder material, most desirably micro-crystalline cellulose. The elimination of the overlay sheet produces very significant economic advantages. In addition, the resultant laminates have superior abrasion resistance, meeting not only the highest NEMA abrasion resistance standards, but also having both superior "initial wear" resistance and superior wear resistance to rubbing and sliding cans and trays (hereinafter "sliding can wear").

Returning to the aforementioned Lane et al U.S. Pat. No. 3,798,111, recent improvements have enabled such paper to be used in the manufacture of solid colored high pressure decorative laminates having good abrasion resistance. Such laminates, while having good abrasion resistance, do not have good wear resistance when subjected to the sliding can test. Thus, when such a laminate is subjected to rubbing of the type produced by sliding cans or trays, the surface texture smooths out relatively quickly giving the appearance of undue wear. There may be dulling or burnishing of the surface. These changes in surface appearance are undesirable to the consumer.

In addition to the above, another source of damage to a laminate surface is scuffing. Prior to the actual installation of a laminate surface the laminate sheet must be handled many times, cut to size, bonded to a substrate, cut to final size, edged, and then finally moved to a final location and installed. During all this handling, the laminate surface can come into sliding contact with surfaces of others sheets, corners of sheets, and corners of edges of other materials. During these various sliding contacts, the laminate surface can gain unsightly scuff marks, which are not distinctly scratches or cuts in the laminate surface.

The scuffs often appear to be a deposit of material from the object rubbing in contact with the laminate surface. for example, if a white colored laminate is rubbed by the corner or edge of a blue colored laminate, the scuff mark appears to have embedded therein blue particles. In this sense, the scuff mark is analogous to the process known as "galling" when two similar clean surfaces of metals are rubbed together at high pressure. It is well known to metallurgists that galling represents a transfer of metal from one surface to the other.

Some scuffs do not have an obvious transfer of material from an offending contacting object. In these cases, the area of the scuff appear to have been burnished to a higher gloss, or dulled to a lower gloss. This type of scuff appears to be caused by a very small amount of flow in the laminate surface due to the pressure of contact with the corner or edge of the offending object. Most frequently, however, the scuffs appear to be caused by a combination of the two effects just described, i.e. galling together with burnishing or dulling.

In the past, most decorative laminates were produced in light colors for work tops and other large area uses. Dark or intense colors could not be used in large areas because of the scuffing problem and therefore were most often used in smaller areas for color accents. Within the past ten years, however, the demand for dark and intense colors has greatly increased, even for large area uses such as the surfaces on store fixtures, elevator cabs, restaurant tables, etc. As scuff marks of the kind described are much more visible when they occur on dark or intensely colored surfaces than on light colored surfaces, they are much more objectionable to the owners of the installation. This has caused a significant amount of customer dissatisfaction, and considerable expense to the manufacturers and frabricators of laminate for replacement of defective installations.

While the laminates as disclosed in the aforementioned Scher et al U.S. Pat. Nos. 4,255,480 and 4,263,081 are much improved in abrasion resistance, initial wear resistance and sliding can wear resistance, they are nevertheless subject to scuffing, of the "galling" type described above, and this is so because their surfaces can act, at the microscopic level, like sand paper, i.e. the hard particles at the surface of the decor sheet can actually protrude above the surface of the finished laminate. This problem is enhanced when the decor sheet is solid, dark colored. The same problem exists for laminates made using the decor paper of the Lane et al U.S. Pat. No. 3,798,111.

The problem of scuff resistance is solved by the incorporation of solid lubricant as disclosed in the O'Dell et al U.S. Pat. Nos. 4,491,137 and 4,567,087. The methods of these patents can also be applied in making abrasion resistant laminate using the special paper of Lane et al U.S. Pat. No. 3,798,111, and the provision of solid lubricant solves the remaining problems of poor scuff and sliding can wear resistance. However, the methods as disclosed in O'Dell et al U.S. Pat. Nos. 4,499,137 and 4,567,087 involve the application of the solid lubricant in a preliminary operation using a temporary binder material, such as microcrystalline cellulose (Avicel) or sodium alginate (Kelgin). As the special paper of the Lane et al patent is more expensive than conventional paper, and as the application of solid lubricant involves a further operation which additionally adds to the cost, it would be desirable to eliminate such an extra operation while still obtaining the benefits of the solid lubricant.

Two U.S. patents are known of peripheral interest. Kelly et al U.S. Pat. No. 4,139,671 relates to a bowling lane having a decorative laminate surface containing an internal lubricant in the laminating resin, which obviates the need for oil treatment or conditioning of the surface of the product. The Niswonger U.S. Pat. No. 3,727,817 concerns an artificial "ice" skating surface of polyester resin, solid wax particles and fiber flock.

RELATED APPLICATION

In copending application Ser. No. 686,350, an improved method of producing abrasion-resistant decorative laminate is disclosed in which the abrasive-resistant particles, with or without additional solid lubricant particles, is applied in a single step during impregnation of the decor sheet with resin solution. This process still requires the presence of a temporary binder material such as microcrystalline cellulose, as a temporary binder is essential in retaining the abrasion-resistant mineral particles on the surface of the decor sheet.

SUMMARY OF THE INVENTION

It is, accordingly, an object of the invention to overcome problems in the prior art, such as mentioned above; another object is to provide high pressure decorative laminate of the type disclosed in the Lane et al U.S. Pat. No. 3,798,111 having greatly improved sliding can wear resistance and scuff resistance.

These and other objects are achieved by dispersing a particulate lubricant such as a wax in the melamine-formaldehyde resin normally used to impregnate decor paper, and impregnating the solid-colored decor paper made in accordance with the process of the Lane et al U.S. Pat. No. 3,798,111, the contents of which are hereby incorporated by reference. During impregnation, the paper acts as a filter so that most of the lubricant particles remains at or near the surface. The so-impregnated paper is then used in the manufacture of decorative laminate in the usual way, with the special decor paper containing lubricant and abrasion-resistant particles in its upper ply. The resultant laminate has not only excellent abrasion resistance, but substantially improved sliding can wear resistance (sliding can test) and scuff resistance. The lubricant should have a sufficiently great particle size to be effectively filtered by the decor paper.

Alternatively, the paper making process of the Lane et al U.S. Pat. No. 3,798,111 can be altered by the incorporation of wax particles along with the mineral particles into the upper ply of the decor paper during its manufacture.

DETAILED DESCRIPTION OF EMBODIMENTS

The scuff resistance and sliding can wear resistance of decorative abrasion-resistant laminates are improved by incorporating in or very near the surface of the upper ply, e.g. the upper surface of the decor paper, finely divided solid wax particles having a particle size in the range of 1-30 microns and a melting point of about 150°-285° F., preferably 220°-230° F. The wax is incorporated in or very near the surface of the solid-colored decor paper made according to the Lane et al U.S. Pat. No. 3,798,111 in one of two ways. First, and preferably, the wax particles are incorporated by dispersing or emulsifying such particles in the resin solution and impregnating the solid-colored, abrasive particle containing paper with the resin solution in such a way that the paper acts as a filter and collects the lubricant particles along its upper surface. This is preferably accomplished by applying the resin solution containing the emulsified or dispersed wax particles to the upper surface of the solid-colored decor paper. As an alternative, the wax particles can be added to the upper portion of the paper during its manufacture along with the abrasive particles in accordance with paper making principles as disclosed in the Lane U.S. Pat. No. 3,798,111, after which the decor paper is then impregnated with resin in the conventional way.

Regardless of which method is used for incorporating the solid, particulate lubricant, the decor paper is then dried at a temperature below the melting point of the lubricant. It is then placed onto a stack of conventional phenolic impregnated core sheets, and consolidated under heat and pressure. During consolidation at a temperature above the melting point of the wax, the wax migrates to the surface to provide a finished laminate surface which has greatly improved scuff and sliding can wear resistance compared with laminates using decor paper according to Lane et al U.S. Pat. No. 3,798,111 but without the added wax.

The selection of the particulate lubricant is important to obtain satisfactory results. Thus, the particulate lubricant of mixture of lubricants should be compatible with the melamine resin. It should melt during pressing so that it will migrate to the melamine laminate surface and be locked in without causing haze or deterioration. It should melt at a temperature below 260° F. to avoid haze in the product; however, haze can be sometimes tolerated, and therefore higher melting waxes can sometimes be used, depending on the requirements of the product. The concentration of the solid lubricant must be selected to be sufficiently low so as not to interfere with the laminating and to avoid reducing the color intensity or clarity of the surface of the decor sheet in the final laminate.

In general, it can be said that the waxes disclosed in the O'Dell et al U.S. Pat. Nos. 4,567,087 and 4,499,137 are satisfactory. Nonionic wax dispersions produce less yellowing and high melt viscosity waxes give better dispersion. On the other hand, oxidized waxes subject the final laminate to reduced stain resistance, and therefore are not desirable. In particular, lubricants which are not preferred include stearates such as sodium and zinc stearate, solid silicone resins, oxidized polyethylene waxes, microcrystalline waxes, and ethylene copolymers with acrylic acid or with vinyl acetate.

The preferred solid particulate lubricants are selected from micronized polyethylene waxes, although a wide variety of other solid lubricants can also be used. The adequacy of any particular solid lubricant can be easily tested by following the disclosed process and testing the resultant laminate to determine if it meets the various requirements for product suitability (including the NEMA requirements in the case of high pressure laminates) plus improved scuff resistance and sliding can wear resistance.

The quantity of particulate lubricant is important in obtaining satisfactory results. If too much lubricant is used, it can adversely affect the laminating procedure itself, and give a laminate which does not meet requirements, e.g. a laminate which may delaminate or one having such a waxy surface that the laminate fails to meet other NEMA LD-3 requirements. Excessive solid lubricant can result in clouding or haze, and can interfere with color of the final product. Moreover, excessive quantities of wax can leave residues on the pressing plates, which require costly cleaning or which can undesirably transfer to other products or cause other problems. When the particulate lubricant is added during the resin impregnation as is preferred, the quantity of such solid lubricant should not exceed about 1% based on the melamine formaldehyde solids. In terms of quantity per unit area, an application rate of 0.25 pounds of particulate lubricant per ream of surface paper is satisfactory, with the preferred range being 0.175 to 0.5 pounds of particulate lubricant per ream of decor paper. When the lubricant is added during the paper making process, a larger quantity may be satisfactorily used.

The following examples and comparative examples will further illustrate the invention:

COMPARATIVE EXAMPLE 1

Laminate was made using Duo-Ply paper of Mead Corporation, solid colored, manufactured according to the aforementioned Lane et al patent. The paper was saturated by dipping in the normal way to provide a resin content of 52%. This paper was then used as the top ply to make solid-colored high-pressure abrasion-resistant laminate. Two products were made, identified as Control 1 and Control 2, and these were tested for rate of wear, scuff resistance, and sliding can wear resistance, the latter according to the sliding can test (2,000 cycles). The results were as follows:

| | Abrasion Resistance 100 Cycles | Scuff Resistance | Sliding Can Test 2000 Cycles |
|---|---|---|---|
| Control 1 | 0.0074 | Poor | Slight wear |
| Control 2 | 0.0078 | Poor | Slight wear |

COMPARATIVE EXAMPLE 2

A product is made consistent with Comparative Example 1 above, except that the melamine resin used to impregnate the paper is first modified according to Example 2 of the Kelly et al U.S. Pat. No. 4,139,671 by the addition of 25% by weight solids of the oxidized polyethylene wax AC 629 (Allied Chemical Company) to provide in the final cured decor paper impregnating resin containing about 5.6% by weight of the polyethylene wax solids on the basis of the resin solids. If laminate is made using this paper as the upper ply, it contains too much wax. In addition, the oxidized polyethylene wax makes the laminate easily subject to staining.

EXAMPLE 1

The same decor paper as used in Comparative Examples 1 and 2 was saturated with a melamine-formaldehyde resin solution containing 62% solids into which was dispersed 1.87 parts by weight (based on 248 parts of melamine resin solids) of micronized polyethylene (Shamrock S-394: melting point 230° F.; specific gravity 0.95; average particle size approx. 12.5 microns) to provide a resin content of 52% and a wax content (based on resin solids) of 0.754%. The decor paper was dried and then used to make laminate in the same way as in Comparative Example 1. The resultant laminate was then tested as in Comparative Example 1 with the following results:

Abrasion Resistance at 100 Cycles: 0.0072
Scuff Resistance: Excellent
Wear Resistance/Sliding Can Test (2000 cycles): No effect

EXAMPLE 2

Example 1 is repeated using the following solid lubricants: Allied Chemical Company A-12 (Polymist polyethylene powder; density 0.99; softening point 140° C.; average particle size 12 microns); Allied Chemical Company B-6 (Polymist polyethylene fine powder; density 0.96; softening point 128° C.; average particle size 6 microns); Micro Powders P-123 (micronized polyethylene wax; melting point 230°-235° F.; density 0.92; average particle size 4 microns); Micro Powders MPP-620 (micronized polyethylene wax; melting point 241° F.; density 0.94; average particle size 2.5 microns); Micro Powders MPP-611 (micronized polyethylene wax; melting point 232° F.; density 0.95; average particle size 2.5 microns).

EXAMPLE 3

Example 1 was repeated substituting an equal amount of Shamrock SST-3 (polytetrafluoroethylene powder), about 5 micron particle size, for the Shamrock S-394 (powdered polyethylene), in the same quantity. A laminate was made and tested with the following results:

Abrasion Resistance at 100 cycles: 0.0072
Scuff Resistance: Excellent
Wear Resistance (Sliding Can Test after 2000 cycles): Very slight wear

EXAMPLE 4

Example 1 was repeated substituting an equal amount of Daniels SL-512 (low M.W. polyethylene wax dispersion, 35% polymer solids of 5 microns average particle size) for the Shamrock S-394, to provide a wax content (based on melamine resin solids) of 0.264%. A laminate was made and tested with the following results:

Abrasion Resistance at 100 cycles: 0.0076
Scuff Resistance: Excellent
Wear Resistance (Sliding Can Test after 2000 cycles): Slight wear It will be obvious to those skilled in the art that various changes may be made without departing from the scope of the invention and the invention is not to be considered limited to what is described in the specification.

What is claimed is:

1. An abrasion resistant, scuff resistant and sliding can wear resistant decorative laminate comprising a core and a resin impregnated cured surface paper, said surface paper comprising
   (a) a paper base layer; and
   (b) a top layer integral with said base layer and comprising from about 2-100% by weight of abrasion-resisting mineral particles having a hardness of from 7-10 on the Moh Scale and an average particle size ranging from 10-75 microns, and solid lubricant from particles having a particle size of about 1-30 microns and a melting point of melting point about 150°-285° F., and present at the surface in a amount of about 0.175-0.5 pounds per ream, with the proviso that said solid lubricant is not an oxidized wax or a silicone resin.

2. An abrasion resistant, scuff resistant and sliding can wear resistance decorative laminate according to claim 1 wherein said lubricant is polyethylene wax from a micronized polyethylene wax.

3. An abrasion resistant, scuff resistant and sliding can wear resistance decorative laminate according to claim 1 wherein said resin is a polyester resin or melamine-formaldehyde resin.

4. A facing sheet for use in the manufacture of an abrasion resistant, scuff resistant and sliding can wear resistant decorative laminate, comprising:
   (a) a base paper layer of fibers and optionally opacifying pigments; and
   (b) integral with said base paper layer an overlayer comprising a mixture of abrasion-resisting material particles having a hardness of 7-10 on the Moh Scale and paper making fibers, the abrasion-resisting mineral particles being present in a quantity and size sufficient to provide abrasion resistance to said facing paper, and said overlayer further comprising at least about 0.175–0.5 pounds of particulate lubricant per ream of said facing paper, said particulate lubricant having a particle size of 1–30 microns and a melting point of about 150°–285° F., with the proviso that said particulate lubricant is not an oxidized wax or a silicone resin.

5. An abrasion resistant, scuff resistant and sliding can wear resistant decorative laminate comprising a core and a facing paper according to claim 4, said facing paper being impregnated with resin, laminated to said core.

6. A facing sheet according to claim 4 containing said opacifying pigments, and in the form of a decor sheet.

7. A facing sheet according to claim 4 wherein said particulate lubricant is present in an amount of about 0.25 pounds per ream of said facing paper.

8. A facing sheet according to claim 4 wherein said particulate lubricant is a micronized polyethylene wax.

9. An abrasion resistant, scuff resistant and sliding can wear resistant decorative laminate according to claim 5 wherein said facing paper is a solid colored decor paper.

10. An abrasion resistant, scuff resistant and sliding can wear resistant decorative laminate according to claim 5 wherein the quantity of said solid lubricant does not exceed 1% based on the weight of solids of said resin.

11. An abrasion resistant, scuff resistant and sliding can wear resistant decorative laminate according to claim 10 wherein said resin is a polyester resin or melamine-formaldehyde resin.

12. An abrasion resistant, scuff resistant and sliding can wear resistant decorative laminate according to claim 5 wherein said particulate lubricant is a micronized polyethylene wax.

* * * * *